United States Patent Office 2,825,995
Patented Mar. 11, 1958

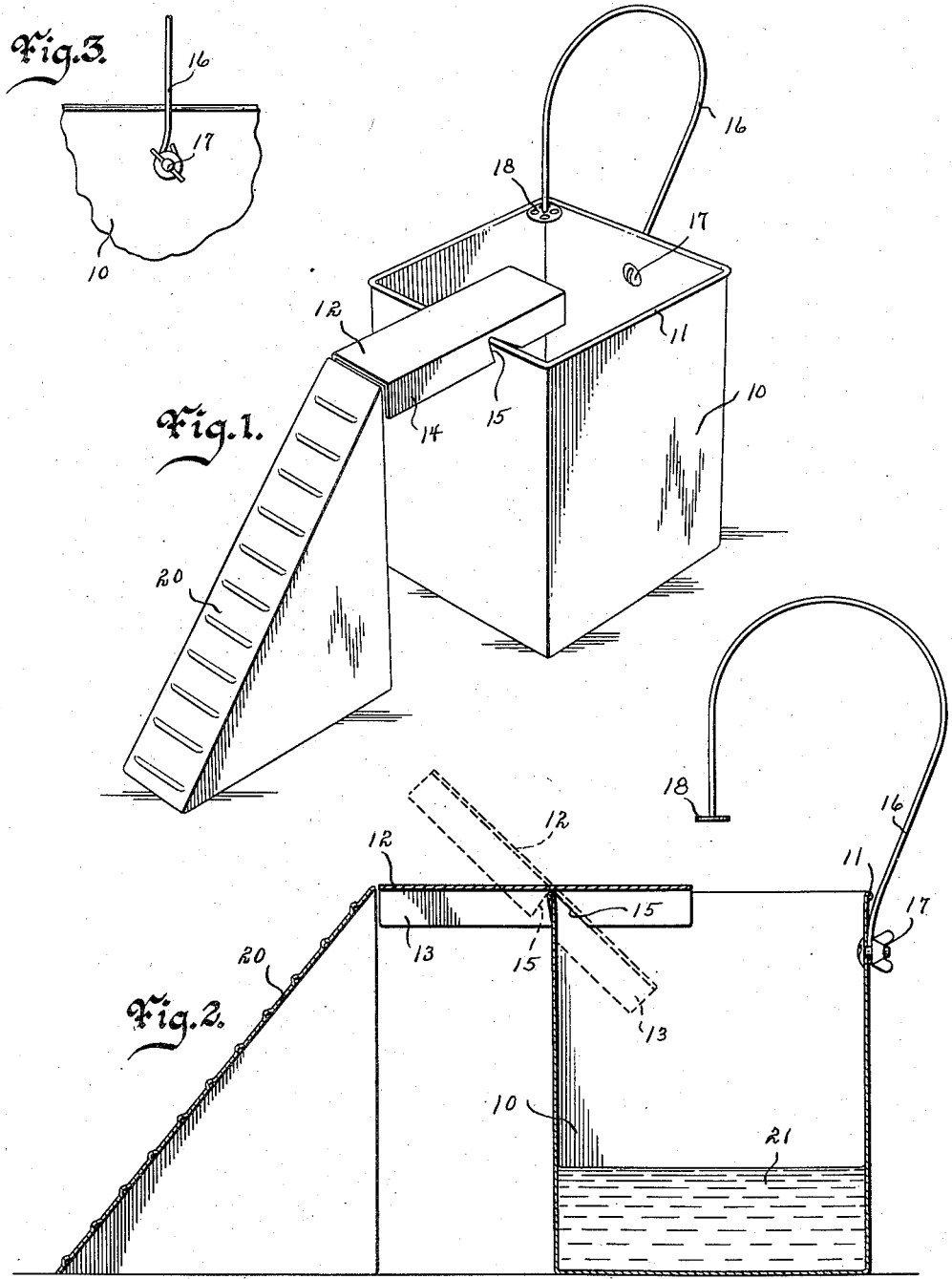

2,825,995

SELF SETTING RODENT TRAP

Harry W. Snider, Hubbard, Iowa

Application January 26, 1956, Serial No. 561,412

6 Claims. (Cl. 43—69)

This invention relates to an animal trap and more particularly to one that is automatically self-setting.

The usual animal trap, such as a mouse trap, has a triggered jaw that springs closed onto the victim. Most people and especially women abhor the idea of removing the usually dead rodent from the trap. Another objection to such traps is that they must be manually reset after each time the trap has been sprung. Also there are objections to these traps on the grounds that they are inhumane.

Therefore, one of the principal objects of my invention is to provide a trap that is capable of catching more than one animal by being automatically self-setting after each catch.

A further object of this invention is to provide an animal trap that makes easy the disposal of the animals caught.

A still further object of this invention is to provide a trap that is capable of catching animals such as mice without harming the animal.

Still further objects of my invention are to provide a mouse or like trap that is economical in manufacture, durable in use, and refined in appearance.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a perspective view of my trap ready for use,

Fig. 2 is an enlarged side sectional view of my device and more fully illustrates its construction, and Fig. 3 is a side view showing one method of securing the bait holding rod to the container.

In these drawings I have used the numeral 10 to designate an open top container. This container may be of any suitable shape but I prefer one of rectangular shape. The numeral 11 designates the top rim of the container. Onto this rim I pivot an elongated runway or walk 12, as shown in Fig. 2. This member 12 (which operates similar to that of a teeter totter) is so balanced as to have its rear end the heavier so that normally its rear end that extends beyond the container will be lowered to a limited horizontal position. The balance, however, is delicate and if a mouse or like were to run to the inner end of the runway extending in a plane over the container, the weight of the mouse would drop the inner end as shown by dotted lines in Fig. 2. While this walk 12 may be of different styles and of different hinge means, the one I show is unique in that it is of only one piece. The walk has two depending side walls 13 and 14. In the central length area of each of these walls I cut a notch 15. The outer rear edge of each of these two notches (when the walk is horizontal) extends substantially vertical and the forward or inner side extends downwardly and forwardly. The notches are placed onto and over the rim 11 of the container as shown in Fig. 1. Inasmuch as the notches are positioned so that the walk will be slightly heavier at rear than front, the rear outer end of the walk will tend to drop. This tendency however is stopped in the horizontal plane by the rear outer edges of the notches 15 engaging the outer side wall of of the container and thereby serving as stop means to prevent the rear end of the walk from falling below its normal horizontal attitude. With the forward edges of the notches extending forwardly and downwardly, the forward inner end of the walk may drop below the normal horizontal plane when a weight such as that of a mouse is exerted on this forward inner end. However, such downward tipping of the forward end and upward movement of the rear outer end of the walk is limited by the eventual engagement of the forward edges of the notches 15 engaging the inner side wall of the container, as shown by broken lines in Fig. 2. Thus, the walk can not become over unbalanced to such an extent that it would not return to a normal horizontal plane after the weight of the mouse has been dumped from its inner forward end. Therefore, the walk 12 is self setting and automatic. By my construction the walk 12 may be lifted completely from the container 10 or as easily replaced. The notches act as bearings and the rim 11 of the container as the axle. Merely by placing the walk onto the container it becomes pivoted thereto and with the container has two limiting stop means in its movement. In placing the walk on the rim, the inner forward end should be so placed as to be at the center area of the container. When so positioned there will be considerable horizontal space between the forward end area of the walk and the sides of the container. The animal therefore will be unable to reach to the sides of the container to escape when the walk drops downwardly under the animal's weight.

Any means may be used to lure the animal out onto the forward portion of the walk. In the drawings I show a rod 16 detachably secured by a wing bolt or like 17 to the opposite side of the container. This rod extends upwardly and then over and near the extreme forward end of the walk 12. A bait platform 18 is secured to the free end of the rod for holding tempting animal bait. The rod also acts as a handle for manually carrying the container. The numeral 20 designates a ramp unit. It may or may not be secured to the container. It is placed so that its runway extends upwardly and forwardly to terminate closely adjacent the rear outer end of the walk 12, as shown in Fig. 1. In shipment or storage, the walk 12, rod 16, and ramp 20 may be installed in the container 10. To use, the device is set up as shown in Fig. 2. If desired water 21 may be placed in the bottom of the container. Mice and like animals like to climb. They will pass up the ramp, and onto the rear outer portion of the walk. To reach the bait, the animal will venture out toward the forward end of the walk. This will drop the forward end of the walk, dumping the animal into the container. Immediately upon the weight of the animal leaving the walk, the walk which has the heavier rear outer end will swing back to normal horizontal condition thus automatically resetting the trap for the next victim.

Some changes may be made in the construction and arrangement of my self setting rodent trap without departing from the real spirit and purpose of my invention, and it is my intention to cover by my claims, any modified forms of structure or use of mechanical equivalents which may be reasonably included within their scope.

I claim:

1. In an animal trap, a container open at its top and having a top rim, a walk having two depending walls on its two side edges respectively, a notch in each of said two walls embracing the top rim of said container; said notch being formed intermediate the ends of said depending walls and in opposed relation, said walk having its outer end at one side of said notches heavier than that of its forward end of the other side of said notches, a bait support secured to said container for holding bait in the vicinity of the forward end portion of said walk; said notches each having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container, and a ramp means leading to the rear end portion of said walk.

2. In an animal trap, a container open at its top and having a top rim, a walk having two depending walls on its side edges respectively, a notch in each of said two walls embracing the top rim of said container; said notch being formed intermediate the ends of said depending walls and in opposed relation, said walk having its outer end at one side of said notches heavier than that of its forward end on the other side of said notches, a bait support secured to said container for holding bait in the vicinity of the forward end portion of said walk; said notches each having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container.

3. In an animal trap, a container open at its top and having a top rim, a walk having two depending walls on its two side edges respectively, a notch in each of said two walls embracing the top rim of said container; said notch being formed intermediate the ends of said depending walls and in opposed relation, said walk having its outer end at one side of said notches heavier than that of its forward end on the other side of said notches, said notches each having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container.

4. In an animal trap, a container open at its top and having a top rim, a walk having a notch in its lower side embracing the top rim of said container; said notch being formed intermediate the ends of said walk and extending laterally across the width thereof, said walk having its outer end at one side of said notch heavier than that of its forward end on the other side of said notch, said notch having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container.

5. In an animal trap, a container open at its top and having a top rim, a walk having a notch in its lower side embracing the top rim of said container; said notch being formed intermediate the ends of said walk and extending laterally across the width thereof, said walk having its outer end at one side of said notch heavier than that of its forward end on the other side of said notch, said notch having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container, and a ramp means leading to the rear end portion of said walk.

6. In an animal trap, a container open at its top and having a top rim, a walk having a notch in its lower side embracing the top rim of said container; said notch being formed intermediate the ends of said walk and extending laterally across the width thereof, said walk having its outer end at one side of said notch heavier than that of its forward end on the other side of said notch, a bait support secured to said container for holding bait in the vicinity of the forward end portion of said walk, said notch having its rear side extending substantially vertical in such a manner as to contact the outside of said container to hold said walk normally in a horizontal attitude and its forward side extending forwardly and downwardly when said walk is in a horizontal attitude whereby the forward end portion of said walk may be tilted into said container.

References Cited in the file of this patent

UNITED STATES PATENTS

| Number | Name | Date |
|---|---|---|
| 481,994 | Woodbury | Sept. 6, 1892 |
| 942,481 | Brecheisen | Dec. 7, 1909 |
| 1,192,098 | Nelson | July 25, 1916 |
| 1,259,074 | Bealle | Mar. 12, 1918 |
| 1,578,080 | Dewey | Mar. 23, 1926 |
| 2,579,093 | Roesner | Dec. 18, 1951 |